March 10, 1964
B. C. HAWKE ETAL
3,124,513
CONTROL ROD DRIVE
Filed March 13, 1961
3 Sheets-Sheet 1
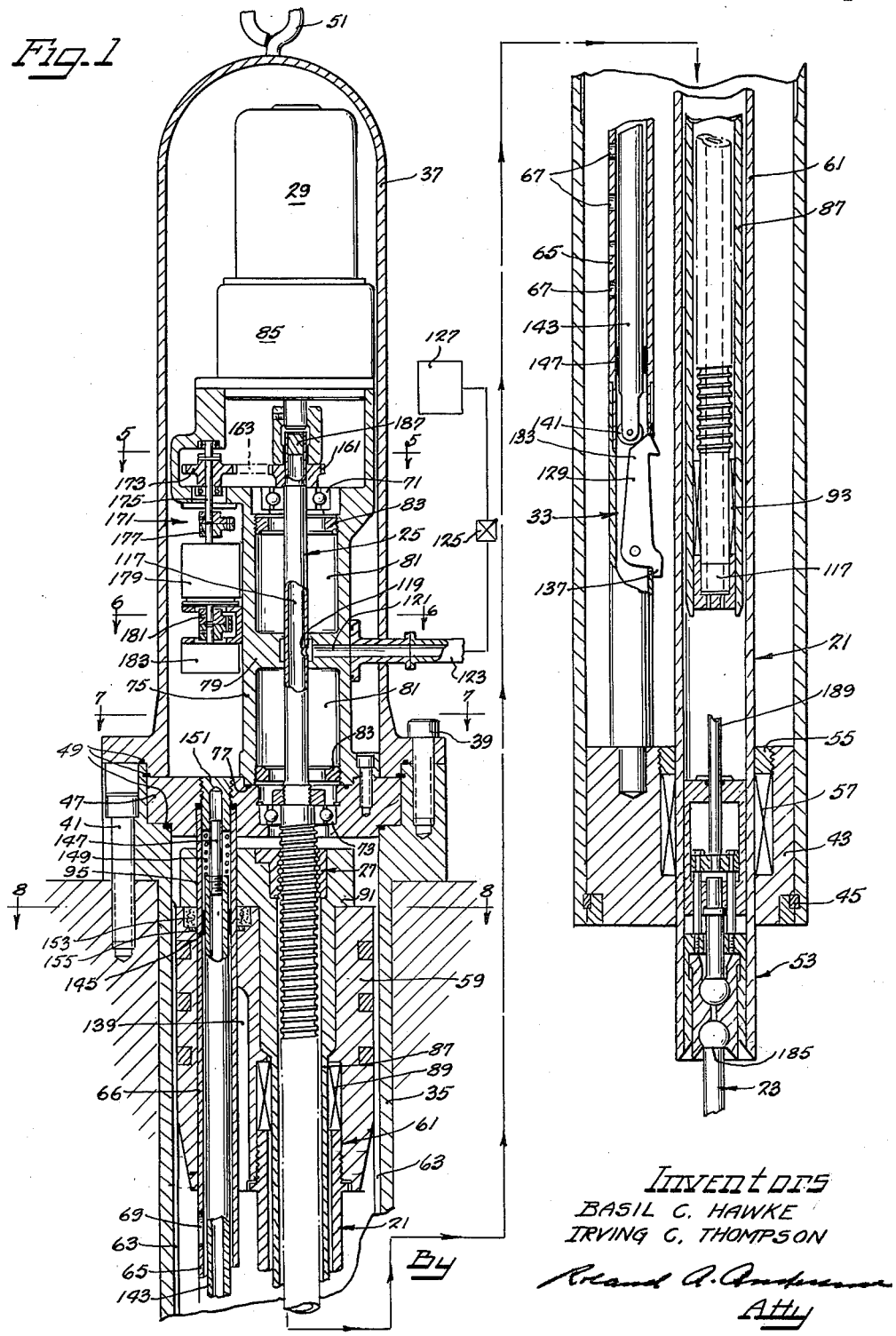
Inventors
BASIL C. HAWKE
IRVING C. THOMPSON
By Roland A. Anderson
Atty March 10, 1964   B. C. HAWKE ETAL   3,124,513
CONTROL ROD DRIVE
Filed March 13, 1961                                           3 Sheets-Sheet 2
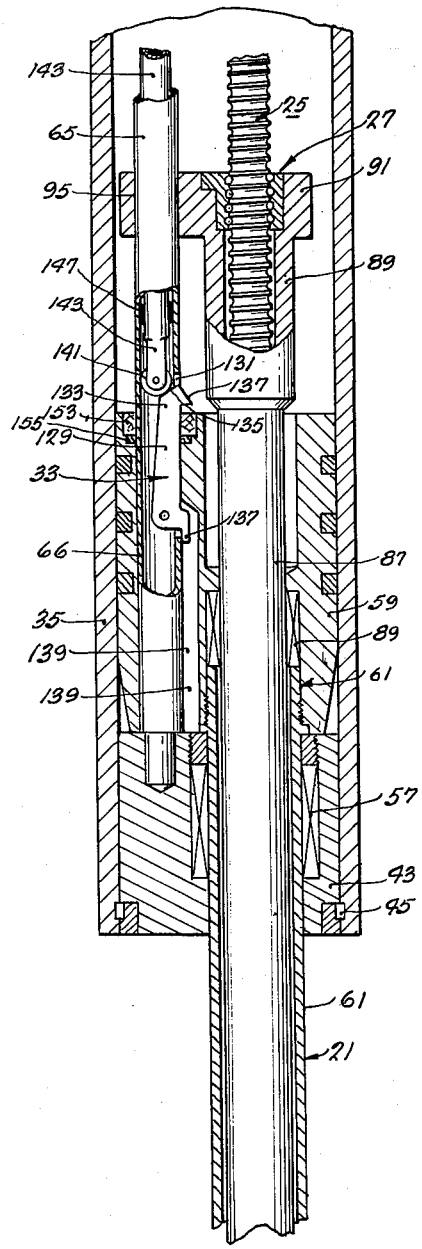
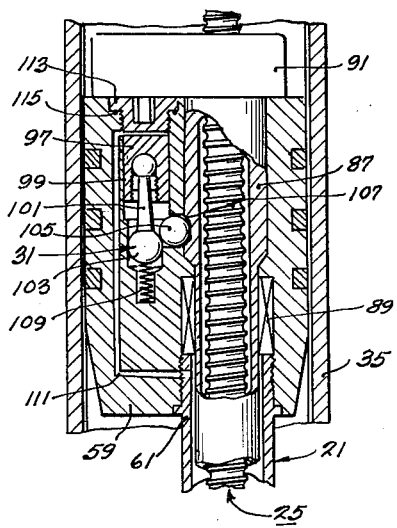
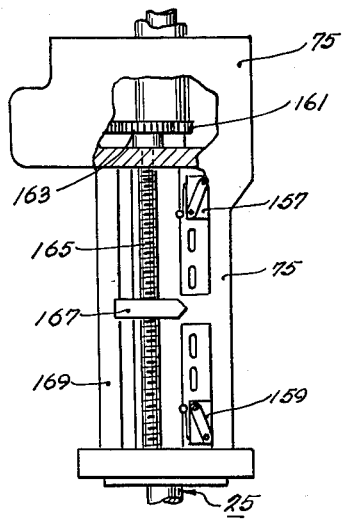
Inventors
BASIL C. HAWKE
IRVING C. THOMPSON
By Roland A. Anderson
Atty

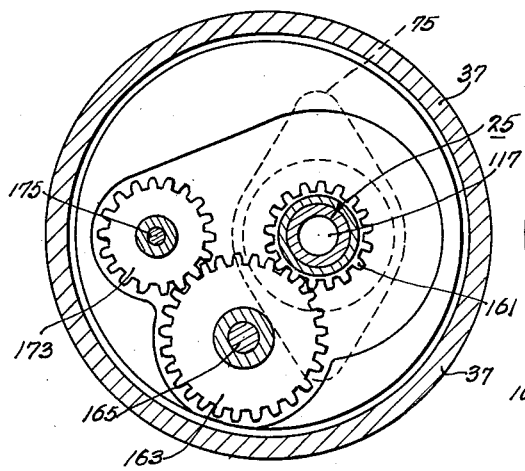
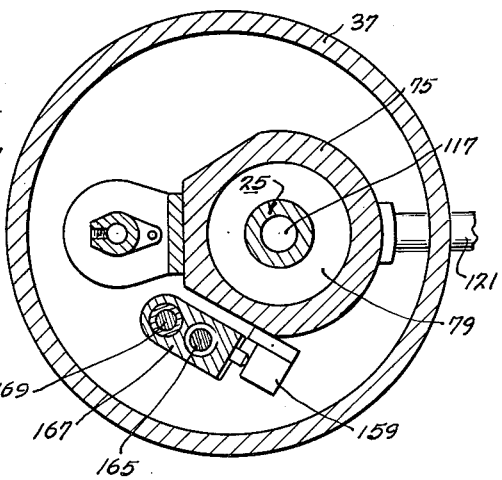
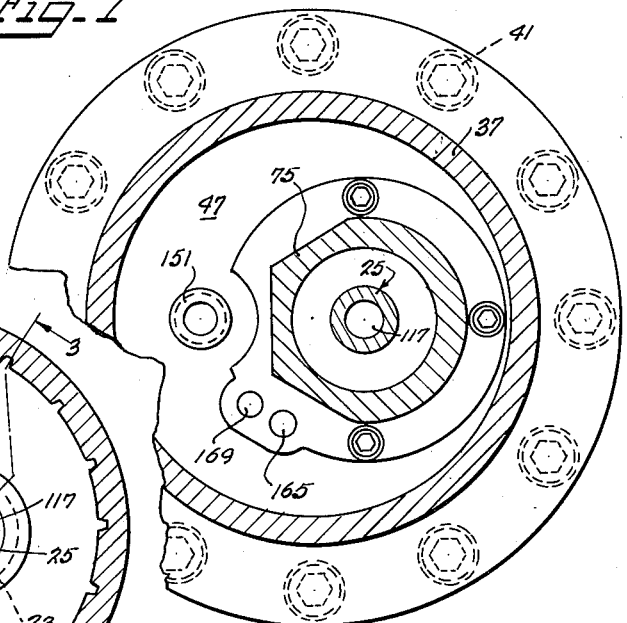
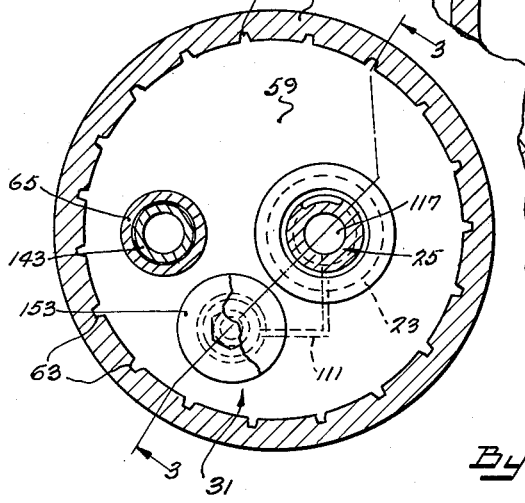

3,124,513
CONTROL ROD DRIVE
Basil C. Hawke, San Diego, and Irving C. Thompson, Ramona, Calif., assignors to the United States of America as represented by the United States Atomic Energy Commission
Filed Mar. 13, 1961, Ser. No. 95,446
4 Claims. (Cl. 176—36)

This invention relates generally to control rod drives for nuclear reactors. More particularly, the invention relates to a fluid actuated drive arrangement for "scramming" a nuclear reactor. In addition, the invention also relates to a mechanism associated with the drive for locking the control rod in its "scrammed" position.

The use of control rods incorporating neutron absorbing materials for regulating the power output and for "scramming" or shutting down, in an emergency, the reactivity of the reactive core of a nuclear reactor is well known. In general, control rod drive arrangements usually include a reversible motor drive which is utilized to effect operating adjustments in the position of a control rod relative to the reactive core. Also included in the over-all arrangements for driving the control rod is further means, operable in response to a pre-arranged signal, for rapidly advancing the control rod into the reactive core to effect emergency shut down or "scramming" of the reactor. Various means utilized in the past to "scram" the reactor have relied heavily, in one way or another, on gravity and were generally not arranged for positive drive when under both normal operating and scram conditions.

The control rod drive arrangements of the past have also generally lacked any sort of device operable as an incident to "scramming" of the reactor to effect positive locking of control rods in their scrammed position. Some of the prior arrangements have relied upon gravity to contain the control rod in the fully inserted or "scrammed" position within the reactive core. The utilization of a positive locking means for preventing unwanted control rod displacement from a "scrammed" position is particularly important in reactors designed for maritime installations. As is well known, ships are subject to rolling, to listing, and even to capsizement during heavy weather and/or as a consequence of a maritime accident.

Accordingly, the invention has for its principal object an improvement control rod drive arrangement for a nuclear reactor. A further object of the invention is the provision of a drive capable of positively controlling the associated control rod or rods under both normal operating conditions and under "scram" conditions. A further object of the invention is the provision of a control rod drive which, under "scram" conditions, utilizes pressure fluid to disconnect the normal operating drive and to positively advance the associated control rod or rods into their "scram" or fully inserted position within the reactive core of a nuclear reactor.

A still further object of the invention is the provision of means for locking a control rod in a fully inserted position within the reactive core as an incident to "scram" operation of the associated control rod drive. Other objects and advantages of the invention will become apparent by reference to the following description and the accompanying drawings of one embodiment of the invention in which:

FIGURE 1 is a side elevational view of a control rod drive arrangement embodying various of the features of the invention, with various parts in section, and with various parts broken away, to more clearly illustrate the construction;

FIGURE 2 is a partial side elevational view of the control rod drive arrangement shown in FIGURE 1, with various parts in section, and with various parts broken away, particularly illustrating the capsizement lock feature of the disclosed construction;

FIGURE 3 is a partial view of the control rod drive arrangement shown in FIGURE 1, particularly illustrating the releasable coupling connecting the scram tube assembly to the lead screw housing assembly, the view being taken generally along line 3—3 of FIGURE 8, with certain parts shown diagrammatically for purposes of clearer illustration;

FIGURE 4 is a side elevational view of the sub-frame, particularly illustrating the limit switch mechanism for controlling movement of the lead screw housing assembly;

FIGURE 5 is an enlarged sectional view taken along line 5—5 of FIGURE 1;

FIGURE 6 is an enlarged sectional view taken along line 6—6 of FIGURE 1;

FIGURE 7 is an enlarged sectional view taken along line 7—7 of FIGURE 1; and

FIGURE 8 is an enlarged sectional view taken along line 8—8 of FIGURE 1.

As shown in FIGURE 1 of the drawings, a control rod drive incorporating various features of the invention includes basically a scram tube or drive shaft 21 which is adapted at one end for connection with the end of a control rod 23 and which is suitably carried for movement toward and away from the reactive core of a nuclear reactor so as to position the control rod relative to the core in accordance with movement of the scram tube. Extending within the scram tube 21 from the outer end thereof is a lead screw 25 which is interconnected with the scram tube 21 by suitable means which, in the disclosed construction, includes a ball-nut 27 for converting rotary motion of the lead screw to linear movement of the scram tube axially of the lead screw. The scram tube 21 is driven outwardly of and inwardly of the reactor during normal operating conditions by a reversible motor 29 which positions the scram tube by means of the before-mentioned lead screw 21 and ball-nut 27, and which is releasably retained mechanically coupled to the scram tube by suitable means 31 (see FIGURE 3). In the disclosed construction, this means couples the lead screw 25 to the scram tube 21 and is operable, under "scram conditions," to disconnect these components incident to the application of pressure fluid. At the same time, pressure fluid is applied to means connected to the scram tube so as to cause movement of the scram tube toward the reactive core, thereby "scramming" or fully inserting the control rod 23 within the reactive core.

The invention also incorporates a latch 33 (see FIGURE 2) which operates automatically, when the drive arrangement is scrammed, to lock the scram tube 21 in its fully extended position, i.e., in the position with the control rod fully inserted within the reactive core for maximum absorption of neutrons so as to accomplish emergency shut-down of the reactor. Although the use of such a latch is generally advantageous in control rod drive arrangements, it is particularly advantageous in connection with a maritime reactor which is subject to rolling and even to overturning incident to capsizement of the supporting ship.

The particular control rod drive arrangement shown in the drawings is designed for vertical mounting above the core of a gas-cooled nuclear reactor. However, various features of the invention can be utilized with advantage in control rod drives which are not vertically mounted and which are used in connection with reactors other than the gas-cooled type. Considering the illustrated drive in greater detail, the scram tube, as well as the other operating components of the drive arrangement, are generally enclosed in a vessel or containment which includes, as shown best in FIGURE 1, a cylindrical, lower or primary containment 35 extending into the body of the reactor and a generally cylindrical, upper or secondary containment 37 suitably secured to the lower containment by a series of bolts 39.

The lower containment 35 is suitably secured by a series of bolts 41 to the top of the reactor and extends inwardly through the shield of the reactor. At its lower or inner end, i.e., the end closest to the reactive core, the lower containment 35 is closed by a suitable plug 43 and is sealed by a gasket 45. At its upper end, the lower containment 35 is sealed from the atmosphere and from the upper containment 37 by a plug 47 and by a series of O rings 49.

The upper containment 37 is closed and sealed at its bottom incident to its attachment to the lower containment 35. At its top, the upper containment is generally of dome-shape and includes a lifting lug 51.

Mounted within the lower containment for movement axially thereof and through a suitable aperture in the bottom plug 43 of the lower containment, is the scram tube 21. At its lower end, the scram tube is closed and sealed by suitable means, and supports a coupling device 53 adapted for releasable connection with the top end of the control rod 23. Carried by the bottom plug 43 of the containment and retained in place by a suitable bushing 55, is a combination bearing and seal 57 which facilitates sliding movement of the scram tube 21 through the bottom plug 43 and, at the same time, prevents the passage of fluid into or from the lower containment 35.

At its upper end, the scram tube 21 is joined in eccentric relation to a snubber piston 59 to form a scram tube assembly 61. The piston 59 engages the interior surface of the lower containment wall to guide the travel of the upper end of the scram tube. In addition, the piston 59 also serves to house the coupling 31, shown in FIGURE 3 and later to be described, and cooperates with the lower containment 35 to arrest travel of the scram tube assembly 61 as it approaches its lowermost position, in which position the control rod 23 connected to the scram tube is fully inserted within the reactive core to thereby effect shut-down of the reactor.

By-passing of the fluid in the lower containment 35 from one side of the piston 59 to the other side during movement of the scram tube assembly in the upper half of the lower containment, and snubbing of the scram tube assembly 61 as it approaches its lowermost position are respectively provided by a series of lengthwise grooves 63 (see FIGURES 1 and 8) in the inner surface of the lower containment wall and by a hollow guide rod or by-pass pipe 65 which is supported by the plugs 43 and 47 located respectively at the bottom and top of the lower containment and which extends through a suitable bore 66 in the piston 59. More particularly, the grooves 63 extend vertically throughout the upper half of the inner surface of the lower containment wall, thereby permitting generally free passage of fluid from one side of the piston 59 to the other so as not to restrict movement of the piston within the upper half of the lower containment. However, after movement of the piston 59 into the lower half of the containment 35, the grooves 63 are no longer available for fluid by-passing, and the descending movement of the scram tube assembly 61 is snubbed by virtue of a series of orifices 67 in the guide rod 65, which orifices are progressively smaller as the bottom of the containment is approached. During descent of the scram tube assembly 61 in the lower half of the lower containment, fluid in the lower containment is by-passed in controlled amounts from in front of the underface of the piston 59 through the orifices 67, up the guide rod 65, and through an aperture 69 into the upper half of the containment.

The lead screw 25 extends, as shown in FIGURE 1, from within the upper containment through the plug 47 and through the upper end of the scram tube 21 in generally axially aligned relation thereto. The lead screw 25 is journalled and supported in spaced upper and lower bearings 71 and 73. The lower bearing 73 is carried by the plug 47 while the upper bearing 71 is fixed at the upper end of a sub-frame 75 which is mounted on the plug 47 and which extends upwardly into the upper containment 37. A suitable O ring 77 is located between the sub-frame 75 and the plug 47 to prevent passage of pressure fluid therebetween. Located within the sub-frame 75 on each side of an intermediate transverse wall or platform 79 is a dynamic rotary seal 81 which prevents passage of pressure fluid. As shown, the rotary seals are retained in place by suitable plugs 83.

At its extreme upper end, the lead screw 25 is suitably keyed to the output shaft of a speed reducer or gear box 85 coupled to the reversible electric motor 29, which is controlled by suitable means exterior of the containment. The gear box 85 and motor 29 are mounted by suitable means on the top of the sub-frame 75 within the upper containment 37.

The lower end of the lead screw 25 extending into the lower containment 35 is coupled to a lead screw housing 87 comprising an elongated hollow tube which generally encloses the lower portion of the lead screw and which extends axially into the scram tube 21 through a suitable bore in the snubber piston 59. In this regard, the scram tube assembly 61 incorporates adjacent its upper end, a combination bearing and seal 89 which facilitates axial relative movement between the lead screw housing 87 and the scram tube assembly 61 and, at the same time, prevents passage of pressure fluid out of the scram tube 21 through the bore in the snubber piston 59.

At its upper end, the lead screw housing includes an enlarged, T-shaped head 91 which has keyed therein the external portion of the ball-nut 27. At its lower end, the housing 87 is open and is retained in axial alignment with the bottom of the lead screw 25 by a combination bearing and seal 93 which is supported at the lower end of the lead screw 25 and which serves to facilitate relative rotative and axial movement between the lead screw 25 and the housing 87 while, at the same time, preventing passage of pressure fluid upwardly within the housing in the annular void between the lead screw and the housing. Rotation of the housing 87 is prevented due to passage of the guide rod 65 through a bore 95 in the enlarged upper head 91 of the housing.

From the foregoing, it will be understood that the lead screw 25 is rotatably driven by the reversible motor 29 with consequent axial movement of the housing 87 being provided by virtue of the ball-nut connection 27. During normal conditions, operation of the motor 29 is effective to control the positioning of the scram tube assembly 61 and hence the associated control rod 23 by virtue of the releasable coupling 31 (see FIGURE 3) in the drive arrangement between the motor and the scram tube assembly. In the disclosed construction, as seen particularly in FIGURE 3, this coupling connects the scram tube assembly 61 to the housing 87 and is releasable incident to the application of pressure fluid to permit movement of the scram tube inwardly toward the reactor core independently of movement of the lead screw housing.

More particularly, the releasable coupling 31 is principally housed in the snubber piston 59. The coupling comprises a piston 97 which is movable in a cylindrical portion of a cavity 99 in the snubber piston and which has pivotally connected thereto at its underface a rod 101 having a sphere 103 at its lower or outer end. Also contained within the cavity 99 is a free floating ball 105 which is contained for movement radially of the axis of the cylindrical portion of the cavity between a position engaging a concave groove 107 in the side wall of the housing 87 so as to maintain the scram tube assembly 61 in locked engagement with the housing, and a position adjacent the connecting rod 101 clear of the groove 107 so as to permit free linear movement of the scram tube assembly relative to the housing. The ball 105 is retained in the locked position by a suitable biasing means which influences the piston in such direction, upwardly in the disclosed construction, so that the upwardly facing, outwardly concave surface of the sphere 103 urges the ball 105 outwardly and into the groove 107. As shown, the biasing means in the disclosed construction takes the form of a helical spring 109 which is located in the bottom portion of the cavity 99 and which acts against the bottom of the sphere 103. Movement of the piston 97 axially of the cavity 99 in response to the application of pressure fluid serves to linearly displace the sphere 103 so as to afford movement of the ball 105 inwardly toward the rod 101 from its position of locking engagement with the groove 107 in the housing 87.

Pressure fluid is applied to the piston 97 incident to "scramming" of the reactor through an orifice or conduit 111 which leads through the snubber piston 59 and from the scram tube 21 at a point below the combination bearing and seal 89 to the cavity 99 at a point above the piston 97. The cavity 99 is closed, as seen in FIGURE 3, by a plug 113 and a suitable gasket 115 which prevents passage of pressure fluid.

"Scram" movement of the control rod 23 is accomplished by pressure fluid, which fluid acts both to uncouple the scram tube assembly 61 from the lead screw housing 87 and to drive the scram tube assembly 61 from the lead screw housing 87 and to drive the scram tube assembly 61 inwardly toward the reactive core. More particularly, pressure fluid is admitted to the scram tube 21 through an axial bore 117 (see FIGURE 1) in the lead screw 25 for passage downwardly and then upwardly alongside the lead screw and through the orifice 111 to release the coupling 31 and for action against the closed lower end of the scram tube 21 to drive the scram tube 21 outwardly of the lower containment 35 relative to the housing 87. Communicating with the bore 117 in the lead screw to admit pressure fluid therein is a port 119 extending radially of the lead screw, which port, in turn, communicates with an annular recess or chamber 121 formed in the transverse wall 79 of the sub-frame 75. This chamber 121 is connected through suitable piping 123, including a control valve 125 which is automatically opened under "scram" conditions, to a source of pressure fluid 127.

Thus, when a "scram" condition develops in the reactor, suitable controls permit discharge of pressure fluid from the source 127 through the bore 117 into the scram tube 21, which entering fluid passes through the orifice 111 (see FIGURE 3) to effect uncoupling of the scram tube assembly 61 from the housing 87 and acts to drive the scram tube 21 inwardly of the reactor.

When the scram tube assembly 61 is fully extended toward the reactive core, it is engaged by the capsizement latch 33 (see FIGURE 2) to prevent unwanted displacement of the scram tube assembly 61 from its lowermost or fully extended position. More particularly, as seen best in FIGURE 2, there is located within the guide rod 65, adjacent its lower end, a latch member 129 which is pivoted on a horizontal axis and which is movable through an elongated opening or slot 131 in the side of the guide rod 65. The latch member 129 is biased by suitable means toward a position of locking engagement with the scram tube assembly 61 and includes, at its upper end, a hook 133 adapted for movement through the slot 131 for engagement with the top face of the snubber piston 59. As will be seen, the extreme top of the hook 133 is shaped in the form of a gable providing two inclined surfaces 135 and 137 which cooperate with other components of the drive arrangement to move the latch to and from its locking position. At its lower end, the latch member 129 includes an ear 137 providing a positive stop for limiting travel under the influence of the biasing means. As also shown particularly in FIGURE 2, the snubber piston 59 includes a recess 139 through which the ear 137 passes as the piston approaches its lowermost position.

In the disclosed construction, the latch member 129 is biased by a roller 141 which is carried on the end of a shaft 143 located in the guide rod 65 and which engages the inclined surface 135 of the hook 133. The shaft 143 is carried in the guide rod 65 for axial movement relative thereto by a bearing 145 (see FIGURE 1) adjacent its upper end, and, adjacent its lower end, by a combination bearing and seal 147 (see FIGURE 2) which prevents passage of fluid into the upper part of the guide rod 65 through the slot 131 through which the latch member 129 is movable.

At its extreme upper end, as seen in FIGURE 1, the shaft 143 has threaded thereon a stub 147 of reduced diameter around which there is positioned a helical biasing spring 149. The spring 149 is contained between the end of the shaft 143 and the bottom of an insert 151 which is threaded into the plug 47 and which contains a closed-end bore extending upwardly from its bottom in which the stub 147 is slidable. When the insert 151 is threaded into the plug 47, the spring 149 is placed under a condition of sufficient compression to bias the latch member 129 toward its locking position for engagement with the scram tube assembly 61.

When the control rod drive is scrammed, the scram tube assembly 61 moves toward the reactive core, causing travel of the snubber piston 59 along the guide rod 65. As the snubber piston 59 approaches its lowermost position, the top face of the recess 139 engages the inclined surface 137 (see FIGURE 2) on the hook 133 of the latch member 129, causing the latch member to be rotated, counterclockwise as seen in FIGURE 2, to a retracted position within the confines of the guide rod 65. When the snubber piston 59 passes below the hook 133 to its lowermost position at the bottom of the lower containment 35, the latch member 129 rotates clockwise, as seen in FIGURE 2, under the influence of the biasing spring 149 (see FIGURE 1) into the locking position in which the hook engages a wear plate 153 threaded flush with the top face of the snubber piston 59. The wear plate 153 also serves to confine a seal 155 which prevents passage of pressure fluid. With the latch member 129 thus engaged with the snubber piston 59, the scram tube 21 cannot be displaced from its fully extended position, whether by unintended accident or by an unexpected dislocation or upturning of the reactor, as for instance, in the case heavy rolling or capsizement of a ship housing the nuclear reactor.

However, the capsizement latch 33 is arranged to permit withdrawal of the scram tube assembly 61 from its fully extended position by means of the normal drive. In this connection, when the housing 87 is driven by the lead screw 25, so that it approaches the bottom of the lower containment 35, the enlarged head 91 of the housing 89 engages the inclined camming surface 137 of the hook 129 so as to swing the hook, counterclockwise, as seen in FIGURE 2, away from its position of locking engagement with the wear plate 153 on the snubber piston 59. As the housing 87 proceeds toward the very bottom of its permissible movement, the enlarged, T-shaped head 91 enters the snubber piston 59 of the scram tube assembly 61 and is locked to the scram tube assembly by the coupling 31 shown in FIGURE 3.

In this regard, the beveled surface at the bottom of the enlarged, T-shaped head 91 of the housing, as seen best in FIGURE 2, serves to radially displace the locking ball 105 (see FIGURE 3) toward the axis of the coupling cavity 99, thereby displacing the piston 97 against the influence of the biasing spring 109. However, in the fully lowered position of the lead screw housing 87, the groove 107 is aligned with the locking ball 105 and the locking ball is urged radially outwardly of the axis of the coupling cavity by virtue of the biasing spring 109 so as to again lock the scram tube assembly 61 to the housing 87. In this relation, the inner wall of the bore 66 in the snubber piston 59 and the bore 95 in the head 91 of the housing 89 present a generally continuous smooth surface. Hence, the hook 133 is prevented from returning to its locking position until after the snubber piston 59 is elevated above the latch member 129 incident to return upward movement of the housing 87.

Limitation of the movement of the housing as it approaches its uppermost and lowermost positions within the lower containment 35, incident to rotation of the lead screw 25 by the motor 29, is controlled by a pair of normally closed limit switches 157 and 159 (see FIGURE 4) which are electrically connected in the motor circuits and which are mounted on the side of the sub-frame 75.

More particularly, the lead screw 25 has keyed thereto adjacent its upper end, as seen best in FIGURES 1 and 5, a gear 161 which meshes with a second gear 163 mounted on a generally vertical shaft 165 journalled in bearings on the sub-frame 75. As seen in FIGURE 4, the intermediate portion of the shaft 165 between the bearings is threaded and carries a limit switch actuator 167 which is guided for movement axially of the shaft 165 incident to rotation thereof by a guide rod 169 fixedly mounted on the sub-frame 75 (see especially FIGURES 4 and 6). Thus, as the lead screw 25 is rotated, the actuator 167 moves up and down the threaded shaft 165 in accordance with movement of the lead screw housing 87.

In this regard, the upper limit switch 157 is adjustably located on the sub-frame 75 so that when the lead screw housing 87 reaches its uppermost position, the actuator 167 engages the limit switch 157 to open the circuit to the motor 29, stopping further elevation of the lead screw housing 87. When the lead screw housing is in its lowermost position, the actuator 167 engages the lower limit switch 159 to open the circuit to the motor 29, thereby stopping further lowering of the lead screw housing. Thus, by this arrangement, the motor 29 is cut out as the lead screw housing 87 approaches its uppermost and lowermost positions to prevent over-travel of the housing and possible consequent damage.

Also driven off the lead screw 25, as shown in FIGURE 1, is a position transmitting mechanism 171 which is suitably connected to a remote unit (not shown) for indicating the position of the lead screw housing 87 within the lower containment 35. Of course, the position of the lead screw housing 87 determines, except after "scramming" of the drive arrangement, the position of the scram tube assembly 61 and, consequently, the position of the control rod 23 relative to the reactive core.

More particularly, the gear driven by the lead screw 25 is also in mesh, as seen in FIGURE 5, with a gear 173 mounted on a short shaft 175 journalled in the sub-frame 75. Connected to the shaft 175 by a suitable coupling 177, as seen in FIGURE 1, is a gear box 179 which, in turn, is connected by a suitable coupling 181 to a position transmitter 183. Thus, rotation of the lead screw 25 also serves to drive the position transmitter 183 so as to provide a suitable signal which can be read at a remote point to determine the position of the control rod.

Connection and disconnection of the control rod 23 and scram tube assembly 61 is facilitated by the coupling device 53 (see FIGURE 1) which is attached to the lower end of the scram tube 21 and which is operable to grasp the upper end of a control rod arm 185. Shifting of the internal mechanism of the coupling device 53 to connect or disconnect the associated control rod 23 is facilitated by a special tool which is not shown. In this regard, after removal of the upper containment 37 from the lower containment 35, disconnection of the motor 29 and gear box 85 from the sub-frame 75 and the lead screw 23, and removal of a plug 187 at the top of the lead screw 25, the special tool can be inserted into the central bore 117 of the lead screw for engagement with an actuating rod 189 of the coupling device, so as to effect operation of the internal mechanism for connection or disconnection of the control rod.

While the disclosed drive arrangement can be scrammed by any pressure fluid, either liquid or gas, gas is preferred for mechanical and structural reasons. In reactors of the gas-cooled type, it is often desirable to use the coolant gas under pressure as the scramming medium. In the disclosed construction which is especially designated for a maritime helium cooled installation, it is desirable to use helium as the pressure fluid.

In operation under normal conditions, the reversible motor 29 can be energized as desired to advance or retract the associated control rod 23 toward or from the reactive core. In this connection, the motor 29 rotates the lead screw 25, and through the ball-nut 27, drives the lead screw housing 87 axially of the lower containment 35. The lead screw housing 87 is normally connected through the coupling 31 to the scram tube assembly 61 which travels with the lead screw housing to advance or retract the associated control rod 23 toward or from the reactive core incident to rotation of the lead screw 25.

In the event of the development of a "scram" condition within the reactor, a suitable signal operates to open the valve 125 in the piping 123 connecting the source of pressure fluid 127 with the chamber 121. The pressure fluid then flows from the chamber 121 through the radial port 119, and through the central bore 117 into the scram tube 21. From the scram tube, a portion of the pressure fluid travels through the orifice 111 (see FIGURE 3) in the snubber piston 59 for action against the piston 97 of the coupling 31, thereby disengaging the scram tube assembly 61 from the lead screw housing 87. At the same time, the pressure fluid in the scram tube acts against the closed lower end of the scram tube and drives the scram tube assembly 61 outwardly of the lower containment 35 into its lowermost or fully extended position. In this position, the associated control rod 23 is fully inserted in the reactive core to effect emergency shut down of the reactor.

When the scram tube assembly 61 reaches its lowermost position, the capsizement latch 33 (FIGURE 2) engages the snubber piston 59 to prevent unintended and unwanted displacement of the scram tube assembly 61 from its fully extended "scram" position. However, as previously explained, when desired, the normal drive can be actuated to disengage the capsizement latch 33 and to recouple with the scram tube assembly 61 to the lead screw housing for withdrawal of the scram tube assembly from its lowermost position incident to subsequent elevation of the lead screw housing.

While the description has generally indicated the association of a single control rod with the drive arrangement, it should be understood that, if desired, several control rods can be associated with a single drive arrangement.

Various of the features of the invention are set forth in the following claims.

What is claimed is:

1. A control rod drive for a nuclear reactor, said drive comprising a scram tube carried for axial movement toward and away from the reactive core of the reactor, the end of said scram tube adjacent to the reactive core being closed and being adapted for connection with a control rod; a housing extending slidably within said scram tube from the other end thereof for axial relative movement therebetween; releasable latch means coupling said scram tube and said housing to prevent axial relative movement therebetween, said latch means being releasable incident to the application of pressure fluid to disconnect said scram tube from said housing, thereby affording axial movement of said scram tube relative to said housing; a lead screw extending within said housing; means interconnecting said lead screw and said housing so as to cause relative movement of said housing axially of said lead screw incident to rotation of said lead screw; and means for applying pressure fluid to said latch means so as to disconnect said scram tube from said housing and for applying pressure fluid within said scram tube for action against said closed end of said scram tube so as to rapidly drive said scram tube toward the reactive core.

2. A control rod drive for a nuclear reactor, said drive comprising a scram tube movable axially to and from between extended and retracted positions relative to the reactive core of the reactor, the end of said scram tube adjacent to the reactive core being adapted for connection with a control rod so as to fully insert the control rod within the reactive core when said scram tube is in its extended position; a lead screw extending within said scram tube from the other end thereof; means connecting said lead screw and said drive shaft so as to cause relative movement of said scram tube axially of said lead screw incident to rotation of said lead screw; means for driving said scram tube under normal conditions toward and away from the reactive core including a motor connected to said lead screw, and releasable interconnecting means located between said motor and said scram tube, said interconnecting means being releasable to disconnect said motor from said scram tube incident to the application of pressure fluid; means for driving said scram tube under scram conditions toward the reactive core including means mechanically connected to said scram tube for rapidly driving said scram tube toward the reactive core in response to the application of pressure fluid, and means for applying pressure fluid to said releasable interconnecting means so as to disconnect said motor from said scram tube and for applying pressure fluid to said means mechanically connected to said scram tube so as to rapidly drive said scram tube toward the reactive core; and means for automatic releasable locking of said scram tube in said extended position.

3. A control rod drive for a nuclear reactor, said drive comprising a scram tube having one end closed and adapted for connection with a control rod and being carried for axial movement toward and away from a position locating the control rod in the reactive core of the reactor to shut down the reactor; a lead screw extending within said scram tube from the other end thereof, said lead screw and said scram tube being axially movable relative to each other; means interconnecting said lead screw and said scram tube so as to cause controlled axial relative movement therebetween incident to rotation of said lead screw, said interconnecting means including means releasably coupling said scram tube thereto so as to prevent axial relative movement between said scram tube and said lead screw, said coupling means being releasable incident to the application of fluid to disconnect said scram tube from said interconnecting means to thereby afford free axial movement of said scram tube relative to said lead screw; means for applying pressure fluid to said coupling means so as to disconnect said scram tube from said interconnecting means and for applying pressure fluid within said scram tube for action against said closed end of said scram tube so as to rapidly drive said scram tube toward said position locating the control rod in the reactive core to shut down the reactor; and means biased for engagement with said scram tube when in said position locating the control rod for shutting down the reactor so as to prevent removal of said scram tube from said position.

4. A control rod drive for a nuclear reactor, said drive comprising a scram tube carried for axial movement to and from between extended and retracted positions relative to the reactive core of the reactor, the end of said scram tube adjacent to the reactive core being closed and being adapted for connection with a control rod so as to fully insert the control rod within the reactive core when said scram tube is in its extended position; a lead screw extending within said scram tube from the other end thereof, said lead screw and said scram tube being axially movable relative to each other; means interconnecting said lead screw and said scram tube for causing controlled relative movement therebetween axially of said scram tube incident to rotation of said lead screw, said interconnecting means including means releasably coupling said scram tube thereto, said coupling means being releasable incident to the application of pressure fluid to disconnect said scram tube from said interconnecting means to thereby afford free axial movement of said scram tube relative to said lead screw; and means for applying pressure fluid to said coupling means so as to disconnect said scram tube from said interconnecting means and for applying pressure fluid within said scram tube for action against said closed end of said scram tube so as to rapidly drive said scram tube to its extended position; and means for automatic releasable locking of said scram tube when in said extended position when said scram tube is disconnected from said interconnecting means, said scram tube locking means being releasable to permit movement of said scram tube from its extended position incident to reconnection of said scram tube with said interconnecting means.

References Cited in the file of this patent
UNITED STATES PATENTS 2,885,893    Lane et al. _____ May 12, 1959
2,990,356    Chapellier _____ June 27, 1961

OTHER REFERENCES

AEC Document, NAA–SR–Memo–685, "U.P.R. Control Rod Latch," Apr. 29, 1953, pp. 3, 4, 5, 7, 9, 11.